United States Patent [19]

Ishii et al.

[11] Patent Number: 4,775,588

[45] Date of Patent: Oct. 4, 1988

[54] METAL SUBSTRATES HAVING HYDROPHILIC RESIN PAINTS CONTAINING FINELY DIVIDED ION EXCHANGE RESINS ON ITS SURFACE

[75] Inventors: Tooru Ishii; Yoshihisa Noyoda, both of Shizuoka, Japan

[73] Assignee: Nippon Light Metal Company Limited, Tokyo, Japan

[21] Appl. No.: 124,404

[22] Filed: Nov. 20, 1987

Related U.S. Application Data

[63] Continuation of Ser. No. 669,435, Nov. 8, 1984, abandoned.

[30] Foreign Application Priority Data

Nov. 11, 1983 [JP] Japan ................. 53-211046

[51] Int. Cl.⁴ .................. C08J 7/04; C08K 3/00; B32B 15/08; B32B 7/02
[52] U.S. Cl. .................... 428/327; 427/240; 427/421; 427/428; 427/429; 427/435; 428/335; 428/336; 428/418; 428/425.8; 428/458; 428/460; 428/461; 428/463; 523/310; 528/27; 528/28; 528/201
[58] Field of Search ............. 428/327, 335, 336, 458, 428/460, 461, 463, 418, 425.8; 427/240, 421, 428, 429, 435

[56] References Cited

U.S. PATENT DOCUMENTS

| | | |
|---|---|---|
| 3,645,922 | 2/1972 | Weiss et al. ............... 521/28 |
| 3,689,438 | 9/1972 | Bourat et al. ............. 521/28 |
| 3,823,106 | 7/1974 | Kimura et al. ............ 523/310 |
| 3,899,624 | 8/1975 | Sutherland ............... 521/32 |
| 3,945,927 | 3/1976 | Imai et al. ................ 521/28 |
| 3,957,698 | 5/1976 | Hatch ....................... 521/28 |
| 4,116,889 | 9/1978 | Chlanda et al. .......... 521/27 |
| 4,252,905 | 2/1981 | Bass .......................... 521/28 |
| 4,294,933 | 10/1981 | Kihara et al. ............ 521/28 |
| 4,339,548 | 7/1982 | Miyahara ................. 521/28 |
| 4,513,032 | 4/1985 | Klintrowski ............. 521/27 |

FOREIGN PATENT DOCUMENTS

| | | |
|---|---|---|
| 1109361 | 6/1961 | Fed. Rep. of Germany ........ 521/28 |
| 2827516 | 1/1980 | Fed. Rep. of Germany ........ 521/28 |
| 0000253 | 1/1983 | Japan ....................... 521/28 |
| 1081181 | 3/1984 | U.S.S.R. .................. 521/28 |
| 1197357 | 7/1970 | United Kingdom .......... 521/28 |

Primary Examiner—Herbert J. Lilling
Attorney, Agent, or Firm—William J. Daniel

[57] ABSTRACT

A hydrophilic film-forming composition which comprises a resin paint comprising a resin binder component and a paint vehicle with a solid ion exchange resin powder dispersed in the vehicle. A film produced therefrom has durable hydrophilic properties, and when combined with a suitable undercoat corrosion resistance is also improved.

10 Claims, No Drawings

METAL SUBSTRATES HAVING HYDROPHILIC RESIN PAINTS CONTAINING FINELY DIVIDED ION EXCHANGE RESINS ON ITS SURFACE

This application is a continuation, of application Ser. No. 669,435, filed 11/8/84, now abandoned.

BACKGROUND OF THE INVETION

1. Field of the Invention

This invention relates to hydrophilic-film-forming preparations which form hydrophilic films on surfaces of materials such as metal, glass, plastics, etc.; to articles having such hydrophilic films; and to a method of forming a hydrophilic film especially having corrosion resistance.

The term "article" as herein used means that made of an appropriate industrial material such as metal, glass, plastics etc. in an appropriate shape, for example, a section such as a short-length plate material, a continuous-length plate material (e.g. a rolled product such as foil, sheet, plate), a circular material such as rod, bar, tubular product, a press blank material, an extruded section etc. or workpieces obtained by processing the above into desired final shapes, which have been provided with a film, and in the case of a section, said shape also includes that adaptable for plastic working processes such as forging, deep-forming, bending, punching, etc.

2. Description of the Prior Art

Hydrophilic-film-forming preparations are used for imparting hydrophilic films on material surfaces so as to prevent the formation of condensed water droplets on the material surfaces and also for antistatic and defogging purposes.

For example, in heat exchangers equipped with plate or with corrugated fins, with the progress in the tendency to higher performance and to compactness, the inter-fin distance has been made smaller for improving heat transfer capacity. Heat exchange with the atmosphere is made via the fin surface and atmospheric moisture condenses on the fin surface, but if the inter-fin distance has been made smaller to e.g. 3–4 mm or less, the condensed water forms a bridge between the fins and hence increases the air-flow resistance, thus resulting in noise generation and a reduction in energy consumption efficiency, and therefore, it has been the practice to prevent the bridge formation by imparting hydrophilic properties to the fin surface. For imparting such hydrophilic properties, an appropriate means is employed according to the metal material used, and, for example, it is known to apply resin paints containing a silica powder or a surface active agent as an agent for imparting hydrophilic properties. However, various problems were encountered; for example, the silica powder came off on press molding resulting in reduced uniformity of the film, and in order to avoid this, if the silica powder was added in a large amount, it in turn reduced the thickness of the inorganic film and reduced the corrosion resistance of the film. Whereas, if the hexavalent chrominum ion concentration was increased in order to offset this effect of silica, then the hexavalent ions dissolved out from the formed film and caused die abrasion when die molding was conducted after film formation, or the surface active agent gradually dissolved out with time to decrease the hydrophilic properties, and in some use environments, the increase in hydrophilic properties caused a decrease in the corrosion resistance of the metal material.

SUMMARY OF THE INVENTION

The present inventors have discovered that since ion exchange resins are inherently insoluble in water, have hydrophilic exchange groups and a strong capacity to absorb water from the atmosphere, by dispersing an ion exchange resin powder in a resin paint, an excellent hydrophilic-film-forming preparation may be obtained. Furthermore, by providing an appropriate undercoat treatment, corrosion resistance is also improved.

Accordingly, it is a main object of this invention to provide film-forming preparations having excellent hydrophilic properties.

Another object of this invention is to provide articles having a hydrophilic film on at least one surface thereof.

It is yet another object of this invention to provide a method of forming a hydrophilic film on at least one surface of a material.

The gist of this invention resides in a hydrophilic film-forming preparation which comprises a resin paint comprising a coating binder component—for example, a natural resin such as an alkyd resin and a synthetic resin such as an acrylic resin—and a coating auxiliary element with an ion exchange resin powder dispersed therein; an article having a film formed with said film-forming preparation on at least one surface thereof; and a method of forming a film having corrosion resistance as well as hydrophilic properties.

DETAILED DESCRIPTION OF THE INVENTION

Examples of the material for the article include metal, glass, plastics and their composites. More specifically, examples of the metal materials include iron, steel, aluminum, copper and other generally employed metals, and alloys thereof. Examples of the plastics include commercially available general-purpose thermoplastic resins, thermosetting synthetic resins, reinforced plastics, etc. These materials may be provided with an undercoat treatment, if desired, as described below in addition to surface cleaning such as degreasing etc. before forming a hydrophilic film.

The film-forming preparation which forms such a hydrophilic film is that having the components described below.

As the coating binder component, those conveniently used in resin paints may suitably be selected from among thermoplastic synthetic resins and thermosetting synthetic resins, but taking into consideration the use conditions of the product to which the hydrophilic film is to be applied, the stability of the ion exchange resin, etc., a resin having a softening temperature of 80° C. or higher is preferred in the case of a thermoplastic resin. In the case of a thermosetting resin, if one having a setting temperature of higher than 150° C. is used, the stoving time for the film is preferably 10 minutes or longer, whereas if a resin having a setting temperature of lower than 150° C. is used, the stoving heating time is preferably up to 1 minute.

As the resin in the coating binder component satisfying the above conditions, alkyd resins, acrylic resins, polyvinyl alcohol resins, vinyl acetate resins, epoxy resins, phenolic resins, polyester resins, silicone resins, fluorocarbon resins, urethane resins etc. may be used but these examples are merely illustrative and not limitative.

Further, the present film-forming preparation may contain, as a coating auxiliary element in order to obtain flowability on coating, either water, in the case of a water-based paint, or a hydrocarbon, an alcohol, an ester, a ketone, an ether or the like in the case of an organic solvent-based paint depending on the characteristics of the resin used, as with the case of conventional paints.

The amount of the solvent added may be freely selected in an appropriate range in order to obtain flowability according to the coating means as with the case of conventional paints, and also may be selected in an appropriate range depending on the desired hydrophilic level.

As the ion exchange resin, in general, those obtained by attaching a hydrophilic atomic groups, such as a sulfonic acid group, a carboxylic acid group, a phosphonic acid group, a phosphinic acid group, a quaternary ammonium group or a primary or secondary amine group to a condensation type resin such as a phenolsulfonic acid type, an ethyleneimine-epichlorohydrin type, an epoxy resin etc., or to an addition polymeric resin obtained by copolymerizing styrene or methacrylic acid with divinylbenzene as a crosslinking agent, are frequently used as cation exchange resins and anion exchange resins. Further, amphoteric ion exchange resins obtained by polymerizing acrylic acid to strongly basic anion exchange resins, fluorocarbon resins into which hydrophilic atomic groups have been introduced, etc. are commercially available and are also usable. From a viewpoint of providing hydrophilic properties, ion exchange resins having an exchange capacity per gram of the dry ion exchange resin of 0.5 [meq./g-Dry R] or more, preferably 1.0 [meq./g-Dry R] or more are employed in this invention. Those having less than 0.5 cannot provide the required wettability.

Furthermore, even that based on a phenolic resin may also be applied as an ion exchange resin if it is insoluble and possesses surface active agent-like characteristics.

Of these ion exchange resins, cation exchange resins (also including alkali metal substituted salt types) are suitably employed in the respect that they are rich in hydrophilic properties and inter alia a sulfonic acid type strongly acidic cation exchange resin is most suitable.

Further, depending on the desired hydrophilic level, it is also possible to use a mixed system of two or more components obtained by mixing a strongly acidic cation exchange resin and a weakly acidic cation exchange resin, a highly basic ion exchange resin and a weakly basic ion exchange resin, or a cation exchange resin, and also possible to use a scrap ion exchange resin with or without a virgin speck.

Commercially available ion exchange resins are usually particles of 10–50 mesh and therefore used after grinding according to the desired film thickness. In general, a film thickness of about 0.5–50 μm is practical. If it is less than 0.5 μm, a film having desired characteristics cannot be stably obtained, whereas if it exceeds 50 μm, improvement in the characteristics level according to the film thickness is not manifested but merely results in an increase in cost. Therefore, considering film thickness, uniformity etc., it is general to grind to an average particle diameter of 1 μm or less, for example, to effect grinding treatment by a vibrating ball mill etc. before use. For example, in the case of fins for heat exchangers, an average particle diameter of 0.5–1 μm is preferred.

Further, if that ground for an analytical grade for special purposes or for a ultrapure grade is available, it is needless to say that it may be used as such. Furthermore, it is also possible to apply a means for adjusting to a desired final particle diameter by auxiliarily utilizing a step of kneading with a resin paint.

While the amount of the ion exchange resin added relative to the coating binder component in the present film-forming preparation can be appropriately selected depending on the exchange capacity of the particular ion exchange resin used and the hydrophilic level desired for the formed film, it is necessary that the proportion of the ion exchange resin to the total weight of the coating binder and ion exchange resin powder be 0.1 or more on the dry weight basis (hereinafter, the aforesaid proportion is referred to as the "exchange resin ratio"). If the exchange resin ratio is less than 0.1, it is difficult to stably obtain the desired hydrophilic level. The exchange resin ratio is suitably in the range of 0.3–0.7. If it exceeds 0.7, the adhesion to the substrate is poor.

For example, where the present film-forming preparation is especially used for antistatic purposes requiring only hydrophilic properties, the exchange resin ratio is preferably 0.5 or more, but where both hydrophilic properties and die moldability are particularly required, it is preferred that the exchange resin ratio be 0.3 or more. Further, where applied to defogging of plastic materials, the exchange resin ratio can be as low as about 0.2.

The solvent or vehicle for the coating auxiliary element may be added to the present film-forming preparation in a mode where it is added to a mixed stock solution of the coating binder component and the ion exchange resin in use, in a mode where these three members are integrally added and mixed at the start, etc.

Further, it is also possible to add to the present film-forming preparation various additives which impart various properties to the paint. More specifically, a dispersant, a mildewproofing agent, an anti-skinning agent, a slip agent, an antifoaming agent etc. may be added in amounts of about 1–2% by weight respectively if desired. Furthermore, as an agent for improving the initial hydrophilic properties, a surface active agent such as $\alpha$-olefinsulfonates etc. may be added in an amount of 0.5–10% by weight.

The use embodiments of the present film-forming preparation are now described. Any conventional coating means in the paint are may be used, for example, roll coating, spraying, dipping, brushing, spin coating etc., and the coating weight in this case is suitably 1–3 g/m$^2$ (dry basis). If the paint is an air drying type, then it is coated and thereafter air dried as such to fix the film, or if the paint is a thermosetting type, stoving is conducted under proper heating conditions which do not adversely affect the characteristics of the ion exchange resin. In the next place, as pretreatment for the film-forming treatment, it is also an effective means to apply undercoat treatment described hereinbelow for the purpose of improving the corrosion resistance of the material surface and the fixing of the film.

As the undercoat treatment, a method of forming an oxidized film or a method of forming an anti-corrosive metal film using aluminum, zinc, copper, chrominum etc., and the like, may be used or these two methods may be used in combination.

As the method of forming an oxidized film, any of conventional methods, e.g. a chemically oxidized film method, an anodized film method etc. can be used, but the chemically oxidized film method is preferred because a film of a relatively thin thickness having excellent corrosion reistance can be continuously and inexpensively obtained.

Examples of the chemically oxidized film method include, according to the bath component, the so-called alkali chromate methods such as MBV method, EW method, Pylumin method and Alrock method and the so-called acidic chromate mthods such as Bonderite method, and Alodine method, as well as Boehmite treating method, a phosphate salt method etc. In general, there is employed a chromate film treating method which comprises using chromic acid fluoride as a main bath component and treating at a bath temperature of 20°–40° C. for 5 seconds to 5 minutes, a chromium phosphate film treating method which comprises using chromic acid, hydrofluoric acid and phosphoric acid as main bath components and treating at 26°–60° C. for 30 seconds to 7 minutes, a phosphate salt film method which comprises using a phosphate salt such as zinc phospate, manganese phospate etc. as a main bath component and treating at a bath temperature of 60°–100° C. for about 5 minutes, or a Boehmite film method which comprises treating with hot water-saturated steam, triethanolamine etc., and the like.

These methods may be effected by dipping, spraying, roll coating, steam gun method etc. By these methods, a chemically oxidized film of 0.005 $\mu m$ or more in thickness is formed, and with less than 0.005 $\mu m$, the characteristics as the anti-corrosive underocat are insufficient. For example, in the case of fins for heat exchangers, about 0.01–0.5 $\mu m$ is preferred, and where there is no need for molding after the film formation, or where the heat conductivity of the film is not important, a film thickness of 5 $\mu m$ or more can also be used.

Examples of the method of forming an anti-corrosive metal film include electroplating, deposition, flame spraying, cladding etc. using a metal such as aluminum, zinc, copper, chromium etc. and an appropriate method is selected therefrom according to the nature of the metal material and the use.

In other words, for example, in the case of zinc coating, a zinc film may be formed by a method which comprises electroplating in a bath containing 150–240 g/l of zinc oxide, 500–550 g/l of sodium hydroxide and 5–10 g/l of sodium cyanide as main components, and acidic zinc electroplating bath method using zinc sulfate, zinc chloride and zinc borofluoride, a zincate electroplating bath method using zinc oxide and sodium hydroxide as main components, a neutral zinc electroplating bath method in which the bath contains a chelating agent such as an oxy acid in addition to zinc chloride, a pyrophosphoric acid bath method etc., or a molten zinc plating method which comprises flux pretreating with ammonium chloride and ammonium zinc chloride and subsequently dipping in a molten metallic zinc bath, zinc flame spraying, cladding, or the like. As the method of coating aluminum, there may be used molten aluminum plating which comprises dipping in a flux bath comprising a chloride system of potassium chloride and sodium chloride or a fluoride system of cryolite and aluminum fluoride and subsequently dipping in a molten aluminum bath, plasma flame spraying, vacuum deposition, cladding etc.

By these methods, an anti-corrosive metal film of 3 $\mu m$ or more in film thickness is formed, and if the thickness is less than 3 $\mu m$, the characteristics as the anti-corrosive undercoat are insufficient. The film thickness varies dependig on the use purpose, and, for example, in the case of fins for heat exchangers, about 5–10 $\mu m$ is preferred, but where there is no need for molding after the film formation or where the heat conductivity of the film is not important, an appropriate thickness of more than 10 $\mu m$ may be used.

Of these methods, as the undercoat treating method of improving the corrosion resistance, the chromate treating method is most preferred in practice and this can exert the best effects including economy.

The hydrophilic film according to this invention has been described above, and the film formed with the present preparation has such features as extremely low deterioration with time in use and very small die abrasion when a material to be treated is die molded after the film formation. Therefore, it is not only suitable as a hydrophilic-film-forming preparation for fin members for heat exchangers equipped with high density fins but it also can form a film rich in the power to retain hydrophilic properties which is not achievable with the conventional preparations and thus may be used for e.g. antistatic defogging purposes etc., and, in addition, by providing desired undercoat treatment, excellent corrosion resistance is manifested.

This invention is more particularly described by the following examples.

EXAMPLE 1

A commercially available sulfonic acid type polystyrene-based cation exchange resin: 4.5 (meg/g-DRY R) (Amberlite IR-120 produced by Rohm & Haas Co.) was ground in a vibrating ball mill for about 30 minutes and dried by an infrared lamp to obtain a fine powder of an average particle diameter of 15 $\mu m$ and a water content of 12%. Thereafter, 200 g of this fine powder, 650 g of an epoxy ester-based water soluble paint (Watersol S-352 produced by Dainippon Ink and Chemical, Inc., solids content 46%), 100 g of butyl cellosolve and 400 g of water were added to a pot mill and kneaded for about 6 hours to achieve uniform dispersion. As a result, the secondary particle diameter of the ion exchange resin became 0.5–1 $\mu m$.

The resultant film-forming preparation was coated using a bar coater (#12) on a previously cleaned aluminum panel as a material and dried at 230° C. for 30 seconds to fix.

COMPARATIVE EXAMPLES

In a case where the epoxy ester-based paint used in Example 1 was directly coated (Comparative Example 1) and a case where a commercially available thermosetting acrylic resin paint containing a wet type surface active agent (solids content 18%) was coated (Comparative Example 2), treatment was conducted using coating and drying conditions similar to those in Example 1. The products of these examples and comparative examples were subjected to various tests. The results are shown in the following Table 1.

In the table, the initial wettability shows the wetted conditions of a sample 30 seconds after picking up said sample dipped in deionized water, and is expressed relative to the case where the entire surface has been wetted taken as 100%.

TABLE 1

| | Water Wettability | | Die Moldability | Brine Spraying Test (after 100 hrs) |
|---|---|---|---|---|
| | Initial Wettability | Wetting Test | | |
| Example 1 | 100% | 100% even after 1000 hrs | Good | Corrosion within 5% |
| Comparative Example 1 | 0 | 0 | Good | Corrosion within 5% |
| Comparative Example 2 | 100% | 50% after 30 hrs | Good | Corrosion within 5% |

Remarks
Wetting Test: The sample was left in an atmosphere of a temperature of 50° C., and a humidity of 100%.
Die Moldability: Evaluated by the die abraded conditions.

From these results, it can be seen that where the resin paint of Comparative Example 2 is used, although the die moldability after the film formation is good, the deterioration of the hydrophilic properties (in this case, expressed by the water wettability) is less with the case of this invention and better results are obtained by this invention.

EXAMPLE 2

8 g of a 5% solution of cobalt naphthenate was added as a drier to the composition of Example 1, and a similar kneading operation was conducted. The resultant paint was coated on a previously degreased aluminum fin plate material for heat exchangers, forcedly dried and left at room temperature for 3 days to fix the film.

Thereafter, a test similar to that in Example 1 was conducted to obtain almost similar results, and, in particular, it was found that there was remarkable enhancement in durability against xylene, thus indicating improved corrosion resistance. This is believed due to the action of cobalt naphthenate as a catalyst.

EXAMPLE 3

A fine powdered sulfonic acid type polystyrene-based cation exchange resin obtained by the process described in Example 1: 4.5 (meq./g-DRY R) (Amberlite IR-120) was mixed with an air drying acrylic resin paint (Acrydic A-165 produced by Dainippon Ink and Chemical, Inc.; solids content 45%) at an exchange resin ratio of 0.70 also together with 0.5% based on the resin paint total weight of a wetting dispersant (BM 1000 produced by Bayerische Motoren Werke AG, West Germany) for improving the dispersibility of the ion exchange resin, and thereafter kneading was similarly conducted in a pot mill for 5 hours.

The resultant film-forming composition was coated on a transparent plastic plate of 1.0 mm in thickness to a dry film thickness of 0.5 μm and left at room temperature to dry and fix.

The coated surface obtained was subjected to an exposure test under conditions of an atmosphere of a temperature of 40° C. and a relative humidity of 90±5% and an outer temperature of 27° C. As a result, the plate having a film formed according to this invention kept transparent and did not show cloudiness, whereas a naked plastic plate without coating showed cloudiness on the entire surface.

EXAMPLE 4

250 g of a dried fine powder (average particle diameter 1.0 μm, water content 5%) of a weakly acidic cation exchange resin; 10 (meq./g-DRY R) (Amberlite IRC-50 produced by Rohm & Haas Co.), 700 g of a modified alkyd resin paint (P-86-50 produced by Dainippon Ink and Chemical, Inc.), 300 cc of xylene, 30 g of a dispersant (BM1000 produced by Bayerische Motoren Werke AG, West Germany) and 7 g of a leveling agent (BM1800A produced by Bayerische Motoren Werke AG, West Germany) were added to and mixed in high speed mixer for 30 minutes. The solids content of the alkyd resin paint was 50%, and the exchange resin ratio of the resultant film-forming preparation was 0.38.

This film-forming preparation was coated by brushing on a zinc plated steel plate, and heated at 200° C. to form a film.

The wettability of the film was measured under conditions similar to those in Example 1 to obtain a wetting test result of 97% after 48 hours, which indicated that the deterioration of the hydrophilic properties was extremely low.

EXAMPLE 5

A hydrophilic-film-forming preparation produced similarly as in Example 1 (except that the average particle diameter of the ion exchange resin ground in the vibrating ball mill was 1.0 μm and the water content after drying by an infrared lamp was 5%) was continuously coated by a roll coater on a previously degreased rolled fin material for aluminum heat exchangers as a material, and dried in a hot air drying oven at 230° C. for 30 seconds to fix.

A test sample was prepared from the resultant fin material, this sample was dipped in deionized water, picked up and the water wettability 30 seconds later was measured to give 100%, and when a wetting test (conducted in an atmosphere of a temperature of 50° C. and a humidity of 100%) was carried out, the water wettability was found 100% even after 1000 hours. Further, the brine spraying test result showed a corrosion rate after 100 hours of within 5%.

Thereafter, the film-formed fin material as an article was punched into fin members of a desired shape by press molding and the fin member surfaces were provided with louver processing.

In the press molding, neither abrasion of the molding die nor damage to the film was observed as was observed with silica-containing hydrophilic films, and thus good working had been effected. Further, when the resultant fin members were used by assembling into an automobile condenser, the intended continuous operation was possible even when there was a change in humidity in the atmosphere.

EXAMPLE 6

A coiled aluminum fin material (made of AA 3105 alloy, plate thickness 0.12 mm) degreased with a weakly alkaline cleaner (trade name: FC 315 produced by Nihon Parkerizing Co., Ltd.) was coated with a phosphoric acid-chromate type treating agent having a concentration of 1.3% by weight (trade name: Alodine 401–45 produced by Nippon Paint Co., Ltd.) by spraying by heating at 35° C. to form an undercoat of about 70 Å on the surface.

Thereafter, a sulfonic acid type ion exchange resin (trade name: R-120B produced by Japan Organo Co., Ltd.) of an average particle diameter of 0.5–1 μm was added to a catalytically curing epoxy ester-based water paint (trade name: Watersol S346 produced by Dainippon Ink and Chemical Co.) so as to give a dry solids content of 40% by weight, and thoroughly mixed to prepare a hydrophilic film-forming composition, which was then coated on the above undercoat to give a coating weight of 1.5 g/m² (dry basis) and heated at 230° C. in a hot air drying oven for 30 seconds to effect stoving heating treatment.

The coiled material obtained by the above film-forming treatment was subjected to punching and wiping to prepare cross members, which were evaluated by tests for hydrophilic properties and corrosion resistance.

More specifically, the long-term stability of the hydrophilic properties was evaluated by the percentage area wetted when left in an atmosphere of a relative humidity of 95% and a temperature of 50° C. for 500 hours, and this was 100%, thus confirming good hydrophilic properties.

On the other hand, the corrosion resistance was evaluated by a 500 hour brine spraying test according to JIS Z 2371 (1955), and it was found that corrosion had been generated neither in the unprocessed part nor in the wiped part, thus confirming also excellent corrosion resistance, and therefore, it was confirmed that by this invention, a film excellent in both hydrophilic properties and corrosion resistance may be obtained and that machinability after the film formation is also excellent.

While the invention has been described in detail and with reference to specific embodiments thereof, it will be apparent to one skilled in the art that variations and modifications can be made therein without departing form the spirit or scope of the invention thereof.

For example, it is possible that a hydrophilic film-forming composition is formed immediately on an article surface by means of mixing components which comprises a step of forming an resin paint film on the article surface and a step of spraying an ion exchange resin powder on said resin paint film.

What is claimed is:

1. A solid metal substrate, selected from the group consisting of iron, steel, aluminum, copper and their alloys, carrying on at least one of its surfaces a solid film of a resin paint so as to prevent the formation of condensed water droplets on said substrate surface, said resin paint consisting essentially of finely divided particles of an ion exchange resin having an ion exchange capacity on dry weight basis of at least 0.5 meq/g in a synthetic binder resin for said resin paint, said binder resin being selected from the group consisting of alkyd resins, acrylic resins, polyvinyl alcohol resins, vinyl acetate resins, epoxy resins, phenolic resins, polyester resins, silicone resins and urethane resins, the ratio of said ion exchange resin particles to the total of said particles and said binder resin being in the range of about 0.1:1 to 0.7:1 on a dry weight basis and sufficient to render said film hydrophilic, said ion exchange resin being at least one resin selected from the group consisting of (a) a cation exchange resin having acidic cationic exchange groups or the alkali metal salt thereof, (b) an anionic exchange resin having basic anionic exchange groups, and (c) an amphoteric exchange resin having both acidic cationic and basic anionic exchange groups.

2. The substrate of claim 1 in which said ion exchange resin particles have an average diameter of 1 $\mu$m or less.

3. The article according to claim 1 wherein the thickness of said film is in the range of 0.5–50 $\mu$m.

4. The substrate according to claim 1 wherein the ratio of ion exchange resin particles to the total of said particles and said binder resin is at least about 0.3:1.

5. The article according to claim 1 wherein said film of resin paint is formed on each such surface of said substrate by roll coating, spraying, dipping, brushing or spin coating followed by drying.

6. The method of providing a solid metal substrate selected from the grou consisting of iron, steel, aluminum, copper and alloys thereof with a solid film of a resin paint on at least one of its surfaces so as to prevent the formation of condensed water droplets on said substrate surface which comprises forming on each such surface a solid film of a resin paint consisting essentially of finely divided particles of an ion exchange resin having an ion exchange capacity on a dry weight basis of at least 0.5 meq/g in a synthetic binder resin for said resin paint, said binder resin being selected from the group consisting of alkyd resins, acrylic resins, polyvinyl alcohol resins, vinyl acetate resins, epoxy resins, phenolic resins, polyester resins, silicone resins and urethane resins, the ratio of said ion exchange resin particles to the total of said particles and said binder resin being in the range of about 0.1:1 to 0.7:1 on a dry weight basis and sufficient to render such article surface hydrophilic, said ion exchange resin being at least one resin selected from the group consisting of (a) a cation exchange resin having acidic cationic exchange groups or the alkali metal salt thereof, (b) an anionic exchange resin having basic anionic exchange groups, and (c) an amphoteric exchange resin having both acidic cationic and basic anionic exchange groups.

7. The method of claim 6 in which said ion exchange resin particles have an average diamter of 1 $\mu$m or less.

8. The method according to claim 6 wherein the thickness of said film is in the range of 0.5–50 $\mu$m.

9. The method according to claim 6 wherein the ratio of ion exchange resin particles to the total of said particles and said binder resin is at least about 0.3:1.

10. The method according to claim 6 wherein said film of resin paint is formed on each such surface of said substrate by roll coating, spraying, dipping, brushing or spin coating followed by drying.

* * * * *